Oct. 16, 1923.

H. R. EDER

MUD LUG

Filed Sept. 12, 1922

1,470,819

Inventor
H. R. Eder
By C. A. Snow & Co.
Attorneys

Patented Oct. 16, 1923.

1,470,819

UNITED STATES PATENT OFFICE.

HAROLD R. EDER, OF PITTSTON, PENNSYLVANIA.

MUD LUG.

Application filed September 12, 1922. Serial No. 587,776.

*To all whom it may concern:*

Be it known that I, HAROLD R. EDER, a citizen of the United States, residing at Pittston, in the county of Luzerne and State of Pennsylvania, have invented a new and useful Mud Lug, of which the following is a specification.

This invention relates to mud lugs to be employed in connection with motor vehicle wheels to increase the traction qualities thereof, and enable the wheel supplied with the device to operate on muddy surfaces.

The primary object of the invention is to provide a device of this character which will have exceptionally efficient gripping qualities to grip the road surface, due consideration being given to the securing means to eliminate any possibility of the securing means slipping when the lug contacts with the road.

Another object of the invention is to provide a device of this character which will be readily and easily applied to a motor vehicle wheel, the lugs being applied in spaced relation with each other throughout the circumference of the wheel.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
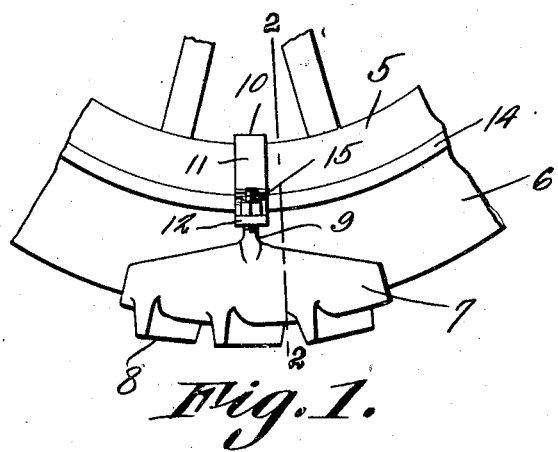
Figure 1 is a fragmental elevational view of a wheel disclosing a mud lug constructed in accordance with the invention, as applied.
Figure 2:
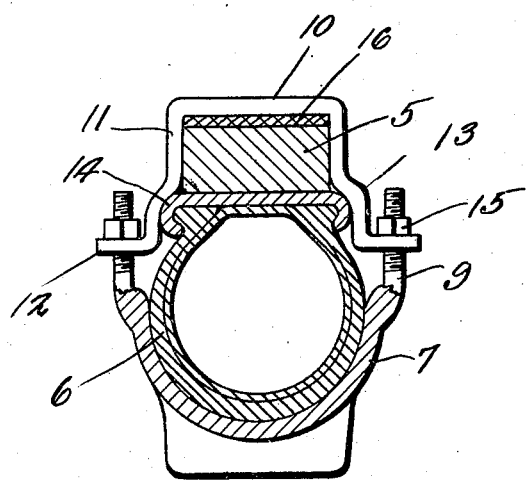
Figure 2 is a sectional view taken on line 2—2 of Figure 1.

Referring to the drawing in detail, the reference character 5 designates the felloe of a wheel which supports the usual pneumatic tire indicated at 6.

The lug, forming the essence of the invention, includes a body portion 7 which is curved transversely of its length to conform to the curvature of the tire to which the same is to be secured, the lug being of a width sufficient to substantially house that portion of the tire engaged by the lug.

The tread of the lug is formed with angularly disposed ribs 8 that are designed to embed themselves in the road surface to grip the road surface and increase the traction of the wheel to which the lug is secured.

Extending from the body portion are the securing bolts 9 that are of lengths to extend to points in a plane with the outer surface of the felloe, thereby rendering the device adjustable for use in connection with felloes of various thicknesses. The securing iron is indicated at 10 and includes leg portions 11 adapted to engage the side edges of the felloe 5 to restrict movement of the securing iron with respect to the felloe, the extremities of the leg members 11 extending at right angles as at 12, where the same are apertured to receive the bolts 9. Formed substantially intermediate the ends of the leg members 11 are curved portions 13 that engage the rim section 14 to further restrict movement of the securing iron with respect to the wheel and eliminate wear between the lug and tire of the wheel.

Nuts 15 operate on the bolts 9 for securing the body portion to the iron 10. In order that the iron 10 may be rigidly secured, eliminating any possibility of the securing iron marring the felloe of the wheel, a leather cushioning strip 16 is provided, which strip permits of excessive pressure being exerted thereto by the operation of the bolts 9 and nuts 15.

From the foregoing detail description, it is believed that further detail description as to the use of the device is unnecessary.

What is claimed is:—

In a device of the character described, a body portion, said body portion having integral securing bolts disposed intermediate the ends of the body portion, a securing iron constructed to embrace the felloe of a wheel, said securing iron having curved portions embracing the rim of a wheel and having right angled end portions formed with openings, said openings adapted to receive the securing bolts and means operating on the securing bolts for securing the body portion and securing iron together.

In testimony that I claim the foregoing as my own, I have hereto affixed my signature in the presence of two witnesses.

HAROLD R. EDER.

Witnesses:
H. J. MAHON,
M. E. JACQUES.